US012282899B2

(12) United States Patent
McHale et al.

(10) Patent No.: US 12,282,899 B2
(45) Date of Patent: *Apr. 22, 2025

(54) ONE CLICK JOB PLACEMENT

(71) Applicant: The Unify Project, Cleveland, OH (US)

(72) Inventors: Stephen J. McHale, Chagrin Falls, OH (US); Brian Lee Heath, Shaker Heights, OH (US)

(73) Assignee: The Unify Project, Cleveland, OH (US)

( * ) Notice: Subject to any disclaimer, the term of this patent is extended or adjusted under 35 U.S.C. 154(b) by 374 days.

This patent is subject to a terminal disclaimer.

(21) Appl. No.: 17/506,232

(22) Filed: Oct. 20, 2021

(65) Prior Publication Data

US 2022/0036316 A1 Feb. 3, 2022

Related U.S. Application Data

(63) Continuation of application No. 17/220,576, filed on Apr. 1, 2021, now Pat. No. 11,195,151.

(Continued)

(51) Int. Cl.
*G06Q 10/1053* (2023.01)
*G06Q 10/0631* (2023.01)

(52) U.S. Cl.
CPC . *G06Q 10/1053* (2013.01); *G06Q 10/063112* (2013.01)

(58) Field of Classification Search
None
See application file for complete search history.

(56) References Cited

U.S. PATENT DOCUMENTS 7,424,438 B2 9/2008 Vianello
7,836,060 B1 11/2010 Rennison
(Continued)

FOREIGN PATENT DOCUMENTS

WO 2020077441 A1 4/2020

OTHER PUBLICATIONS

L. G. Rodriguez and E. P. Chavez, "Feature Selection for Job Matching Application using Profile Matching Model," 2019 IEEE 4th International Conference on Computer and Communication Systems (ICCCS), 2019, pp. 263-266, doi: 10.1109/CCOMS.2019. 8821682. (Year: 2019).*

(Continued)

*Primary Examiner* — Laura Yesildag
(74) *Attorney, Agent, or Firm* — Benesch Friedlander Coplan & Aronoff LLP

(57) ABSTRACT

A job matching algorithm improves matching a job opening profile to a job-seeker with accuracy and efficiency by breaking down the job opening profile into a data model of standard codes. Job criteria are abstracted as attributes into at least categories of qualifications and characteristics, having an associated assigned weight. Job-seeker profile's corresponding attributes in qualifications and characteristics are multi-dimensionally mapped to those in the job opening profile to calculate an overall score against a threshold score for successful matching. The job-seeker's profile and the job opening's profile may also be re-matched using an elastic analysis to model job seeker's strengths and growth potential for a same or a different job, through adjusting individual weights of each attribute of the qualifications and characteristics of one or both of the job-seeker's profile and the job opening profile to predict risks or successes for the job-seeker in taking the job opening.

21 Claims, 8 Drawing Sheets

Related U.S. Application Data

(60) Provisional application No. 63/005,141, filed on Apr. 3, 2020.

(56) References Cited

U.S. PATENT DOCUMENTS

| | | | |
|---|---|---|---|
| 8,156,051 | B1 | 4/2012 | Shah et al. |
| 8,516,149 | B1 | 8/2013 | Edmett Stacey |
| 10,152,695 | B1 | 12/2018 | Chiu et al. |
| 10,318,926 | B2 | 6/2019 | Champaneria |
| 2001/0039508 | A1 | 11/2001 | Nagler et al. |
| 2002/0055870 | A1 | 5/2002 | Thomas |
| 2003/0182171 | A1 | 9/2003 | Vianello |
| 2006/0265267 | A1 | 11/2006 | Chen et al. |
| 2007/0162507 | A1 | 7/2007 | McGovern et al. |
| 2009/0150166 | A1 | 6/2009 | Leite et al. |
| 2009/0198558 | A1 | 8/2009 | Chen et al. |
| 2009/0319326 | A1 | 12/2009 | Yamada |
| 2011/0276507 | A1 | 11/2011 | O'Malley |
| 2013/0006794 | A1 | 1/2013 | Horvitz |
| 2014/0058954 | A1 | 2/2014 | Perstein et al. |
| 2014/0122355 | A1* | 5/2014 | Hardtke ............ G06Q 10/1053 705/321 |
| 2014/0358810 | A1 | 12/2014 | Hardtke et al. |
| 2015/0006414 | A1 | 1/2015 | Janapareddy et al. |
| 2015/0006422 | A1 | 1/2015 | Carter et al. |
| 2015/0170103 | A1 | 6/2015 | Garg et al. |
| 2016/0063441 | A1 | 3/2016 | Kamat et al. |
| 2016/0379170 | A1 | 12/2016 | Pande |
| 2017/0011325 | A1 | 1/2017 | Hanna et al. |
| 2017/0287038 | A1 | 10/2017 | Krasadakis |
| 2018/0060823 | A1* | 3/2018 | Garimella .......... G06Q 10/1053 |
| 2019/0130361 | A1 | 5/2019 | Azarika et al. |
| 2020/0364250 | A1* | 11/2020 | Kube ................. G06F 16/3322 |
| 2021/0312401 | A1 | 10/2021 | McHale et al. |

OTHER PUBLICATIONS

W. Shalaby et al., "Help me find a job: A graph-based approach for job recommendation at scale," 2017 IEEE International Conference on Big Data (Big Data), 2017, pp. 1544-1553, doi: 10.1109/BigData.2017.8258088. (Year: 2017).*

Z. Elgammal, A. Barmu, H. Hassan, K. Elgammal, T. Özyer and R. Alhaj, "Matching Applicants with Positions for Better Allocation of Employees in the Job Market," 2021 22nd International Arab Conference on Information Technology (ACIT), Muscat, Oman, 2021, pp. 1-5, doi: 10.1109/ACIT53391.2021.9677374. (Year: 2021).*

K. Appadoo, M. B. Soonnoo etl a. "Job Recommendation System, Machine Learning, Regression, Classification, Natural Language Processing," 2020 IEEE Asia-Pacific Conference on Computer Science and Data Engineering (CSDE), Gold Coast, Australia, 2020, pp. 1-6, doi: 10.1109/CSDE50874.20 (Year: 2020).*

Rodriguez, L.G. et al., "Feature Selection for Job Matching Application using Profile Matching Model," 2019 IEEE 4th International Conference on Computer and Communication Systems (ICCCS) 2019, pp. 263-266 (4 pages).

Shalaby, W. et al., "Help me find a job: A graph-based approach for job recommendation at scale," 2017 IEEE International Conference on Big Data (Big Data), 2017, pp. 1544-1553 (10 pages).

International Search Report and Written Opinion in International Application No. PCT/US21/25412, mailed Jun. 4, 2021 (8 pages).

Singh, A. et al., "Prospect: A System for Screening Candidates for Recruitment," CIKM '10, Oct. 26-30, 2010, retrieved on May 22, 2021 from <URL: https:/dl.acm.org/doi/pdf/10.1145/187143.1871523> (10 pages).

International Search Report and Written Opinion dated May 23, 2022 for PCT Application No. PCT/US2022/16328, 13 pages.

Extended European Search Report dated Mar. 26, 2024 for European Patent application No. 21780894.8, 9 pages.

Extended European Search Report issued in European Patent Application No. 22926281.1, dated Nov. 22, 2024.

* cited by examiner

ONE CLICK JOB PLACEMENT

CROSS-REFERENCE

The present application is a Continuation Application, which claims priority to and the benefit of U.S. patent application Ser. No. 17/220,576, filed on Apr. 1, 2021, which claims priority under 35 U.S.C. § 119 from U.S. Provisional Patent Application Ser. No. 63/005,141 entitled "One Click Job Placement," filed on Apr. 3, 2020, the disclosures of which are hereby incorporated by reference in their entireties for all purposes.

TECHNICAL FIELD

The present application relates to systems and methods for simplifying job matching processes using multi-dimensional and elastic analysis to match job opening's criteria to job-seekers' qualifications and characteristics.

BACKGROUND

Human resources are a significant asset contributing to the success and growth of a business organization. The labor market and the job market are both dynamic and competitive markets that can be difficult to fully tap into. Despite the availability of computer and software tools and easy access of information on the Internet to aid recruiting, employers nevertheless, find it still challenging and quite time consuming to fill certain job openings with the best matched talents.

The inefficiencies in filling certain job openings with the best matched talents may be partly due to limited access to the talent pool, and partly due to the traditional evaluation methods are rigid and limited in the ability to handle complex multi-dimension analysis of applicant's qualifications and strength, both quantitatively and qualitatively. Likewise, prospective talents who may or may not be seeking for a job change may in fact be an ideal candidate for certain job openings, yet miss out some of these opportunities for a lack of outreach or a lack of persuasive analytics to motivate them to take actions.

The description provided in the background section should not be assumed to be prior art merely because it is mentioned in or associated with the background section. The background section may include information that describes one or more aspects of the subject technology.

SUMMARY OF THE DISCLOSURE

A method of job placement is disclosed in the following description. The method may include executing by at least one processor on a computer, a job matching algorithm stored on a non-transitory computer-readable memory medium that performs online job opening matching between a job-seeker profile and one or more job opening profiles. The method may include the job matching algorithm retrieving, from an applicant database, a plurality of attributes in qualifications and a plurality of attributes in characteristics of a job-seeker profile. In an example, the plurality of attributes in the qualifications and the plurality of attributes in the characteristics of the job-seeker profile may be abstracted from job-seeker's answers to a list of questions by the job matching algorithm.

The job matching algorithm may perform matching, to determine a weighted match score, corresponding plurality of attributes in the qualifications between the job-seeker profile and one or more job opening profiles from an employer database. The method may further perform matching, to determine a weighted fit score, corresponding second plurality of attributes in the characteristics between the job-seeker profile and the one or more job opening profiles. The weighted match score and the weighted fit score may be combined to determine an overall score. When the overall score exceeds a first threshold score, a successful job opening match may be found in order to advance to a next recruitment or hiring decision, otherwise, the job matching algorithm may perform: (a) adjusting one or both of: the weighted match score and the weighted fit score to re-determine an adjusted overall score; and (b) performing, according to the adjusted overall score, one or both of: a re-matching to the one or more job opening profiles according to the first threshold score, and a new matching to a new job opening profile from the employer database, according to a second threshold score, wherein the new job opening profile has not been previously matched. When a successful job opening re-matching or new job opening matching is found, the job matching algorithm may advance to the next recruitment or hiring decision, otherwise, it may continue repeating the steps in (a) and (b) either until a successful job opening re-matching or new job opening matching or terminating after a defined number of repeated overall score adjusting, job opening re-matching or new job opening matching. Accordingly, when after multiple iterations the job matching algorithm still does not advance the job-seeker to a next recruitment or hiring decision on behalf of the employer, the job matching algorithm may make recommendations as what actions the job-seeker may take to qualify for a different job that had not been previously matched to, after receiving certain training, certification or pursuit of a degree. In effect, the job matching algorithm tool may engage both the employers and the job-seekers as a coach by providing a tool that performs broad and elastic analysis to match the best available resources to the best opportunities with good fit.

In another embodiment, the job matching algorithm may be stored as codes in a non-transitory computer-readable medium (such as stored in a cloud memory, in a solid state hard drive, in an optical disk or in a flash drive, etc.), which when executed by at least a processor in a computer, the job matching algorithm may cause the computer to perform online job opening matching between a job-seeker profile and one or more job opening profiles, by performing the steps as previously described.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The disclosure may be better understood with reference to the drawings and description. The elements in the figures are not necessarily drawn to scale, emphasis instead being placed upon illustrating the principles of the disclosure. Moreover, in the figures, like-referenced numerals may designate to corresponding parts in the different figures. The term "job-seeker", "job applicant" and "talent", "candidate" may be used interchangeably. The term "system AI" and "AI system" may be used interchangeably without limiting. The term "block" or "module" refers to a collection of program codes specific to execute one or more functions in an algorithm.

The job matching algorithm in the disclosure may provide solutions or improvements in matching a job opening profile to a job-seeker with accuracy and efficiency by breaking down a job opening profile into a data model of standard codes. Job criteria are abstracted as attributes into at least categories of qualifications and characteristics, having an associated assigned weight. Job-seeker profile's corresponding attributes in qualifications and characteristics are multi-dimensionally mapped to those in the job opening profile to calculate an overall score against a threshold score for successful matching. The job-seeker's profile and the job opening's profile may also be re-matched using an elastic analysis to model job seeker's strengths and growth potential for a same or a different job, through adjusting individual weights of each attribute of the qualifications and characteristics of one or both of the job-seeker's profile and the job opening profile to optimize risks or successes, and adaptability for the job-seeker in taking the job opening.

Figure 1A:
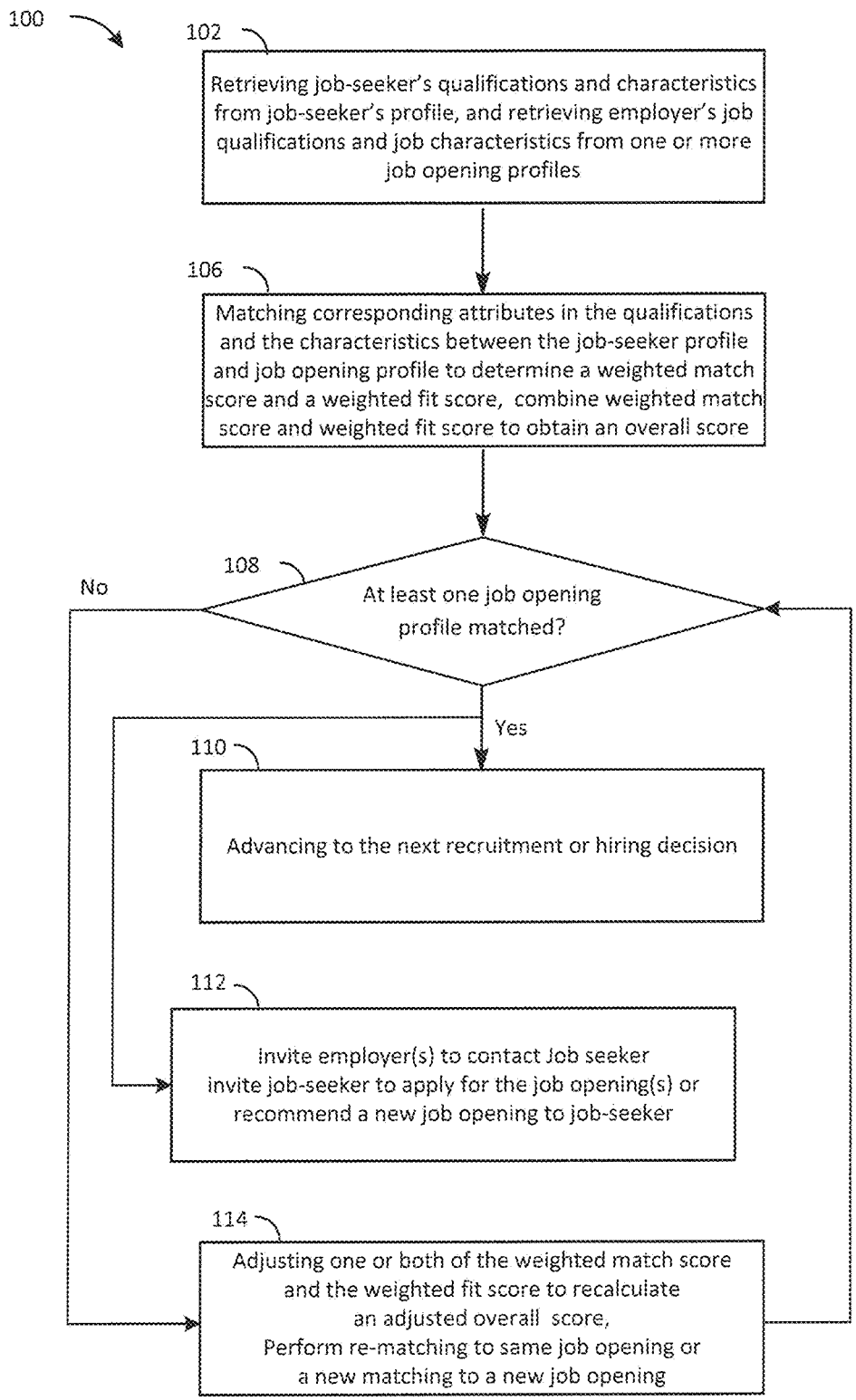
FIG. 1A illustrates an example of a computer implemented method for job matching.

FIG. 1A illustrates an example of a computer implemented method 100 for job matching. In implementation, the method 100 may be carried out by a communication system 120 illustrated in FIG. 1B. The method 100 may be executed by at least a processor 142 in a server 140, a job matching algorithm 150 that is stored on a non-transitory computer-readable memory medium 144 to perform online job opening matching between a job-seeker profile stored in an applicant database and one or more job opening profiles stored in an employer database 124.

In step 102, the job matching algorithm 150 may retrieve from an applicant database 122, job-seeker's qualifications and characteristics from job-seeker's profile, and retrieve employer's job qualifications and characteristics from one or more job opening profiles. In implementation, a plurality of attributes in the qualifications and a plurality of attributes in the characteristics may be abstracted from job-seeker's answers to a list of questions using a communication terminal 123 (e.g., smart phone, laptop computer, desk top computer, tablet, etc. The plurality of attributes in the qualifications and the plurality of attributes in the characteristics may be stored in the applicant database 122 under the job-seeker's profile. Likewise, the job matching algorithm 150 may abstract a plurality of attributes in the qualifications and a plurality of attributes in the characteristics from employer's answering to a list of questions pertaining to the one or more job opening profiles stored in the employer database 124.

In step 106, the job matching algorithm 150 may perform matching of corresponding attributes in the qualifications and the characteristics between the job-seeker profile and the one or more job opening profiles to determine a weighted match score and a weighted fit score, and combining the weighted match score and the weighted fit score to obtain an overall score.

In step 108, the overall score is compared to a first threshold score for the one or more job opening profile. When the overall score exceeds the first threshold score, a successful match to at least one job opening profile may be found and the job-seeker's profile may be forwarded to the one or more employer in order to advance to a next recruitment or hiring decision in step 110. Otherwise (i.e., the overall score is below the first threshold score), the job matching algorithm 150 may adjust one or a combination of: the overall score, the weighted match score and the weighted fit score (details to be discussed in FIG. 1C) in order to re-determine an adjusted overall score for a re-matching to the same one or more job opening profiles according to the first threshold score, or to perform a new matching to a new job opening profile from the employer database. When a successful re-matching to the job opening or a matching to the new job opening is found, in step 112, the job matching algorithm may advance to the next recruitment or hiring decision which may automatically invite one or a combination of the following: (a) invite an employer of the one or more job opening profiles to contact the job-seeker, (b) invite an employer of the new job opening profile to contact the job-seeker, and (c) invite the job-seeker of the job-seeker profile to apply for the same job opening or the new job opening.

If the re-matching or the new matching is not successful, the job matching algorithm 150 may loop back to further adjust one or both of: the weighted match score and the weighted fit score to re-determine an adjusted overall score; perform one or both of: a re-matching to the same one or more job opening profiles according to the first threshold score, or alternately perform a new matching to a new job opening profile from the employer database, according to a second threshold score, until a successful re-matching to the job opening profile or successful in matching to the new job opening matching, otherwise terminating the matching after a defined number of repeated overall score adjusting, job opening re-matching or a new job opening matching.

Figure 1B:
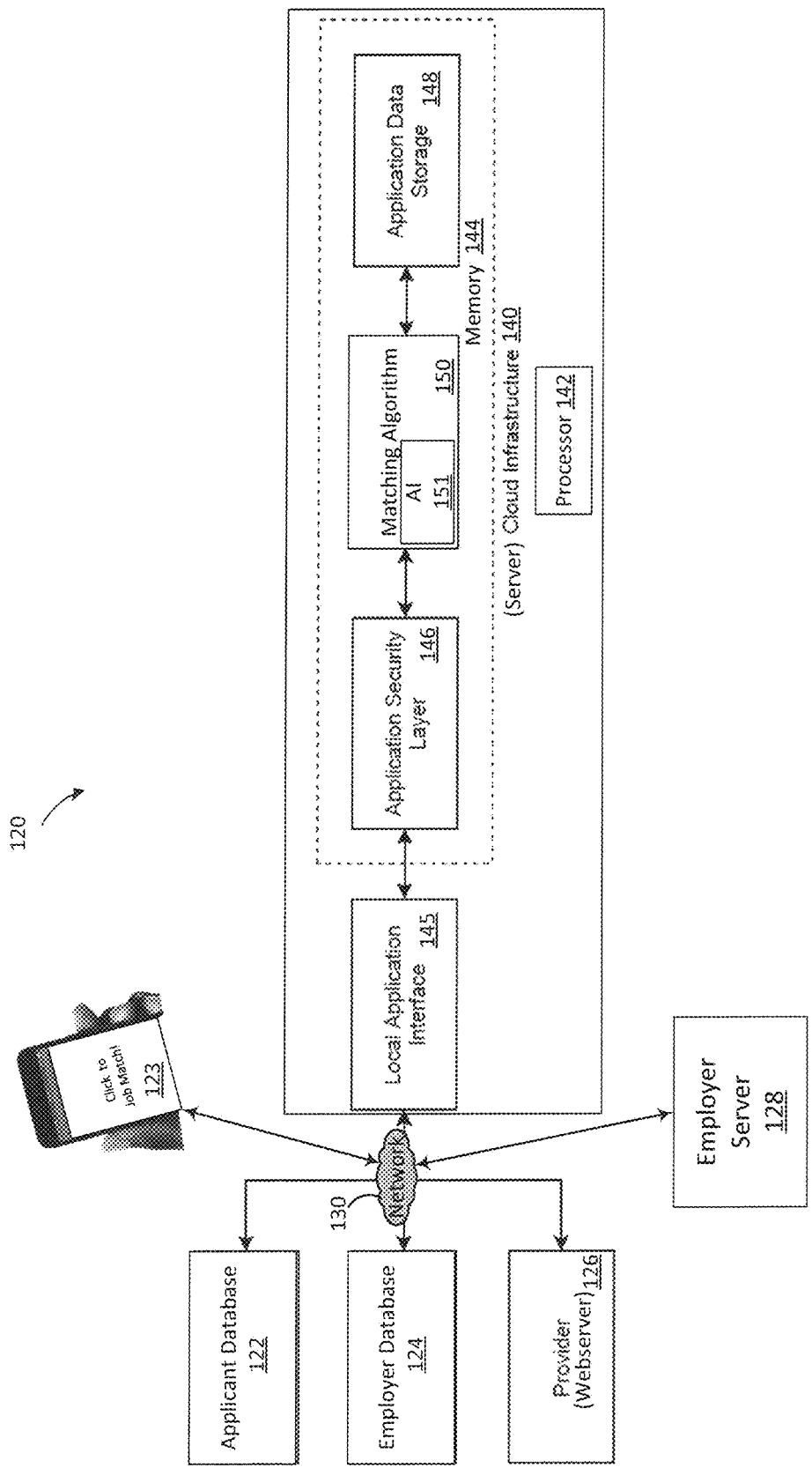
FIG. 1B illustrates an example of a computer implemented system to carry out the job matching method.
Figure 1C:
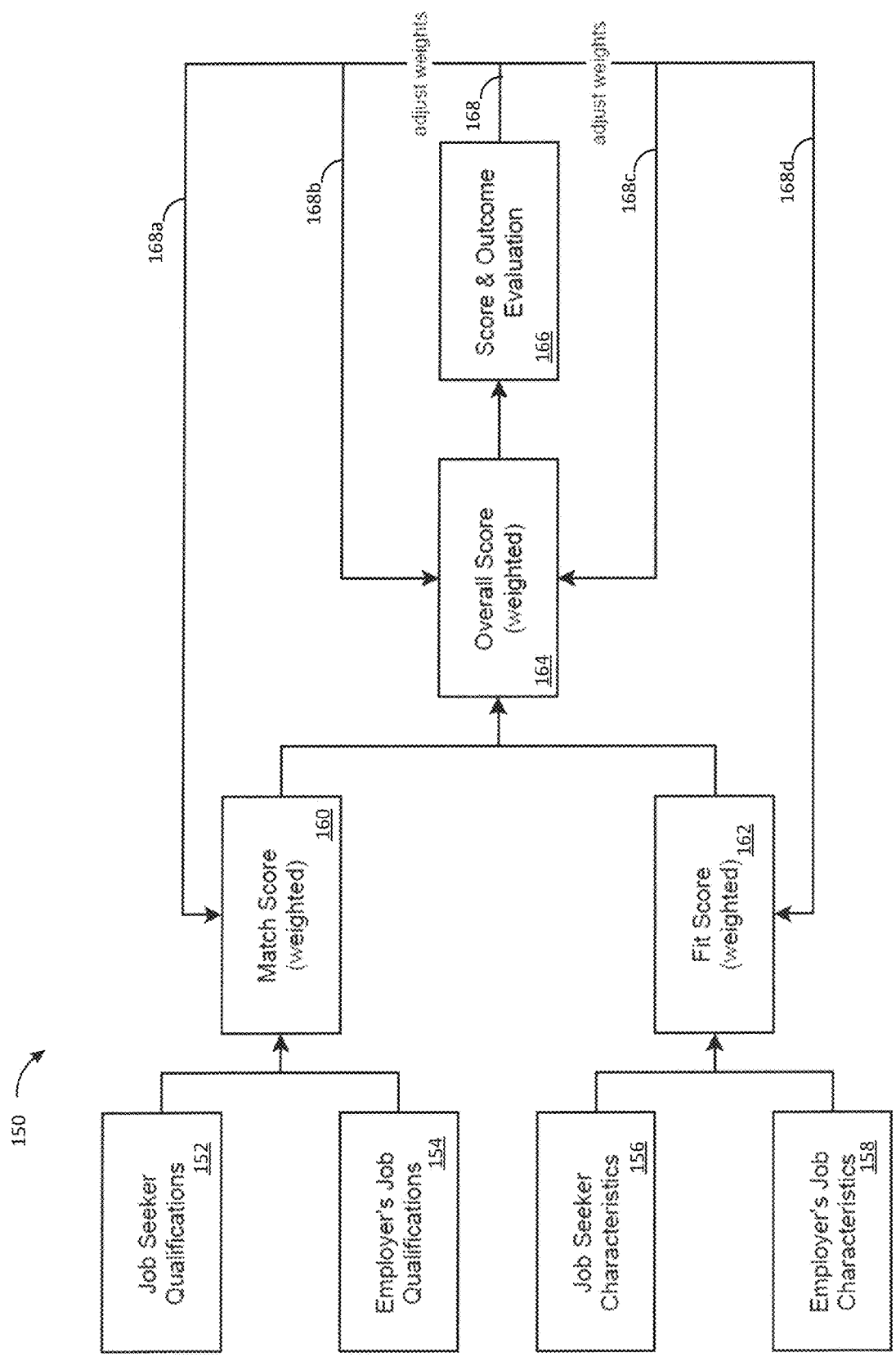
FIG. 1C illustrates exemplary functional blocks in carrying out the job matching algorithm.

FIG. 1C illustrates exemplary functional blocks in carrying out the job matching algorithm 150. In an example, the job matching algorithm 150 may include at least a Job Seeker Qualifications block 152, an Employer's Job Qualifications block 154, a Job Seeker Characteristics block 156, an Employer's Job Characteristics block 158, a Match Score (weighted) block 160, a Fit Score (weighted) block 162, an Overall Score (weighted) block 164, and a Score Evaluation block 166.

In implementation, the plurality of attributes in the qualifications and the plurality of attributes in the characteristics of the job-seeker profile may be abstracted from job-seeker's answers to a list of questions by the Job Seeker Qualifications block 152 and the Job Seeker Characteristics block 156 respectively, in the job matching algorithm 150. The plurality of attributes in the qualifications in the job-seeker profile may include job-seeker's information pertaining to at least: education history, employment history, relevant job experiences, relevant job skills, awards or certifications, foreign language skills, and wherein the characteristics in the job-seeker profile may include job-seeker's information pertaining to at least: job related activities, interests, personal styles, values and context.

Likewise, the plurality of attributes in the qualifications and the plurality of attributes in the characteristics of the job opening profile may be abstracted from one or more employers' answers to a list of questions (e.g., experiences, knowledge, education, abilities, and skills they may require for a job seeker to fill the job opening, work activities, interests, styles, values, and context etc.) to the one or more job openings by the Employer's Job Qualifications block 154 and by the Employer's Job Characteristics block 158 respectively.

The Match Score (weighted) block 160 may compare corresponding attributes of the job-seeker and one or more employer's job qualifications and calculate a match score based on selected weights (also known as weighted match score). The Fit Score (weighted) block 162 may compare corresponding attributes of the job-seeker and employer's job characteristics and calculates a fit score based on selected weights (also known as weighted fit score). The Overall Score (weighted) block 164 may calculate an overall score based on combining the weighted match score and the weighted fit score. The Score Evaluation block 166 may evaluate a the overall score by comparing the overall score to the a required threshold score. The evaluation results may further adjust the weights of the weighted match score, weighted fit score, and the overall score for an elastic analysis to assess or optimize risks or successes, and to observe the matched job-seeker's adaptability in taking the job opening.

In implementation, the elastic analysis may be performed automatically by the job matching algorithm 150 or by training an artificial intelligence (AI) component 151 (shown in FIG. 1B) to vary different weight values such as adjusting the weights of the Match score, Fit Score, and Overall Score to evaluate different possible outcomes using a variety of known optimization methods, including Deterministic Optimization, Stochastic Optimization, Linear Programming, Continuous or Discrete Optimization, Unconstrained or Constrained Optimization, or Monte Carlo analysis, to name a few.

In implementation, the job matching algorithm 150 may adopt an initial set of default functional weights. For example, a first equal default functional weight value may be initially assigned to each attribute in the qualifications and a second equal default functional weight value may be initially assigned to each attribute in the characteristics of the job-seeker profile. Likewise, a third default equal functional weight value may be initially assigned to each attribute in the qualifications and a fourth default equal functional weight value may be initially assigned to each attribute in the characteristics of the one or more job opening profiles or the new job opening profile. In other words, the default functional weight values of the attributes in the qualification and the characteristics may be equally weighted to start with.

The Match Score block 160 may be configured to evaluate qualifications match by performing a default calculation on the first weighted match score by summing respectively, the third default functional weight values of all matched attributes in the qualifications between the job-seeker profile and the one or more job opening profiles (or the new job opening profile). Likewise, the Fit Score block 162 may be configured to evaluate characteristics match by performing a default calculation on the second weighted fit score by summing respectively, the fourth default functional weight values of all matched attributes in the characteristics between the job-seeker profile and the one or more job opening profiles or the new job opening profile. In other words, the default calculations will consider only the weight assignments of the job opening profile, without any weight contribution or influence from the job-seeker profile.

Alternately, it may be informative to include or to accommodate certain amount of contributions from the qualifications and characteristics in the job-seeker profile when calculating the overall score, for a more complete picture in selecting the best matched and best fit talent among a list of matched job-seekers in the analysis. In this regard, the Match Score block 160 may be configured to evaluate qualifications match by summing respectively, an average or a weighted average of a portion of the first and the third default functional weight values of all matched attributes in the qualifications between the job-seeker profile and the one or more job opening profiles or the new job opening profile. Likewise, the Fit Score block 162 may be configured to evaluate combined characteristics match by summing respectively, an average or a weighted average of a portion of the second and the fourth default functional weight values of all matched attributes in the characteristics between the job-seeker profile and the one or more job opening profiles or the new job opening profile. In the weighted average summing, attributes which are more important may be assigned a higher weight value while other attributes may be assigned a less weight or a zero weight. In other words, the default summing calculation (i.e., summing only the contributions of the default weight values in the job opening profile only) may be perceived as a subset of weighted average summing, which the contributions of the default weight values in the job-seeker profile are assigned a weight value of zero. Alternately, the weighted average summing method may select only a portion of the attributes in the job-seeker profile to be assigned with a weight for average summing, while the other unselected attributes may be assigned with a zero weight for average summing. Other weight summing methods not mentioned may be implemented without limiting, so that the outcome of the weighted match score and the weighted fit score (and consequently the overall score) may be elastically adjusted to accommodate different amount of contributions from each of the job-seeker profile and from the job opening profile, respectively.

Alternately, it may be advantageous for an employer to consider relaxing certain job criteria to attract a wider pool of talents who may have higher strengths in certain most needed attributes in the qualifications or characteristics, yet may seem weaker in other attributes that may have growth potential over time or may be strengthened through training after hiring. In this case, the job matching algorithm 150 may be configured to perform an elastic analysis by selecting a portion (or entire portion) of the attributes in both the qualifications and the characteristics to have the corresponding assigned weights be adjusted (to increase or decrease) to provide outcome re-evaluations in order to optimize risks, successes, and adaptability for the best matched job-seeker when taking the job opening.

In an example, the selected weight adjustment may be made automatically by training an AI system 151 within the job matching tool 150, to enable placing heavier emphasis on certain "must have" attributes, while placing a lighter emphasis (or none) on "nice to have" attributes when matching. The AI system 151 may be trained to model an elastic analysis based on a designated range to test a sensitivity of the qualifications match or fitness match. For example, certain job requires minimal human interactions but heavy on analytical skills (e.g., research, engineering), so the attributes on social skills may have a lighter weight, but the technical attributes may be adjusted heavier in weight.

In another example, the selected weight adjustments may alternately be manually inputted by the employer or by the job-seeker when answering the questions, or defining a certain range as a goal for analysis, as a learning tool and to simulate career development choices. For example, the employer may be allowed to update its value or range requirements based on changes in job criteria. On the job-seeker side, once a weight value or range is entered in the profile answers, the matching tool 150 may prevent updates on the profile at least for a minimum duration of time (e.g., 2 months) to ensure candor and truthfulness in the answers or the information provided, except that the updates are triggered by significant events such as graduation, job change, receiving government or professional licenses or certifications, etc. In practice, the job-seeker may elect to answer additional profile questions to enable the job matching algorithm 150 to automatically adjust a functional weight assignment to one or more attributes in a respective category of the qualifications or characteristics in the job-seeker profile for current job opening re-matching or for a new job opening matching, or simply to observe job skills improvement to target certain career path directions. Alternately, the job-seeker may elect to manually adjust the functional weight assignment to observe changes for job-seeker's understanding of career growth prospects or for job-seeker's education/training planning In implementation, the employer may specify a range of weight adjustment in each attribute when posting the job opening profile (use default weight when no range is provided). The employer may benefit from using the elastic analysis information to adjust a selected portion of the attributes according to their importance in order to glean a larger pool of talents, to weigh the strengths versus the weaknesses of each candidate prior to proceeding to a next level decision for an interview or for hiring. The job-seeker may benefit from using the elastic analysis information to guide career development paths and set goals for skills growth and leadership roles in future. The job-seeker may receive alerts of current field or other field job opportunities based on the elastic analysis information. Furthermore, the job-seeker may benefit from the elastic analysis information through sending links to education or training providers 126 to further acquire the needed skills or training through continue education in case of a career change consideration or for a better match to the existing job opening profile.

When applying elastic analysis using selected weight adjustment matching or re-matching, an initial match and evaluation outcome 168 from the overall score may be calculated from the default weight values assigned to the attributes, the outcome 168 may be fed back (see paths 168a to 168d) to adjust a selected weight value of the attributes in any one or all of the: Match Score block 160, Fit Score block 162 and Overall Score block 164 to re-evaluate an adjusted outcome. The selected weight adjustments may adjust the weighted attributes to a higher or a lower weight value without changing a maximum total weight value.

For example, assuming there may be 20 attributes in the qualifications (which has an assigned weight of 7) and 10 attributes in the characteristics (which has an assigned weight of 3), then the initial default weight assignment to each attribute in the qualification may be $\frac{1}{20}$ of 7 for matching purpose while the initial default weight assignment to each attribute in the characteristics may be $\frac{1}{10}$ of 3 for matching purpose, to an overall maximum score of 10 (i.e., perfect match). Therefore, any adjustment in any of the attributes in either the qualifications or the characteristics may be balanced by adjusting an equal amount by one or more remaining attributes in the qualifications in order to keep the assigned weight of the qualifications to exactly 7, and likewise keeping the assigned weight of the characteristics to exactly 3, etc. In other words, at least two or more attributes would be involved for any selected weight adjustments to the attributes in each category of the qualifications or the characteristics. The criteria of job opening matching such as a threshold may be set when the job-opening profile is established. For example, employer may set a threshold at 8.5 or higher (out of 10) in the overall score in order to be considered sufficient for a next level contact or hiring decision.

An example may be used to illustrate a selected attribute weight adjustment in the elastic analysis. Assuming there are 20 attributes in the qualifications to accumulate to an assigned weight of 7 (out of 10), and assuming there are 10 attributes in the characteristics to accumulate to an assigned weight of 3 (out of 10). Thus the combined overall weight makes up a maximum overall score of 10. Accordingly, each attribute in the qualification category may have an assigned default weight of $(\frac{1}{20}) \times 7$, while each attribute in the characteristics category may have an assigned default weight of $(\frac{1}{10}) \times 7$.

For example, a job opening profile for an integrated circuit (IC) design engineer, may adjust a "core engineering courses >3.0 GPA" attribute requirement from a default weight of $\frac{1}{20}$ to $\frac{2}{20}$, while setting a research publications attribute weight from $\frac{1}{20}$ to 0 in order to maintain the qualifications category total cumulative assigned weight unchanged at 7. Therefore, an applicant with a BSEE (bachelor of science in electrical engineering) degree having a 3.2 GPA will be considered as equally qualified as an applicant with a PhD degree in EE who has 3.6 GPA and authored 6 publications. However, if the IC design engineer job opening profile assigns a different weight in the education level attributes ($\frac{1}{20}$ for BS, $\frac{2}{20}$ for MS and PhD), then a job-seeker with a MS degree or a PhD degree may score higher in the weighted match score than a job-seeker with a BS degree. Likewise, the similar weight adjustments may be applied to the attributes in the characteristics category.

Alternately, the job matching algorithm 150 or the employer may decrease the weight of qualifications category from 7 to 6 (see adjustments 168b, 168c to Overall Score block 164), while the weight of characteristics category may be increased from 3 to 4 to maintain an overall score at 10 maximum. Other weight values or adjustment combinations to both the attributes weights and the category weights may be performed by a person of ordinary skill in the art without limiting by the method illustrated above.

In implementation, the adjusting of the weighted match score may optionally be configured by one or a combination of the job-seeker and the employers. The job-seeker may optionally configure a first plurality of customized functional weights to two or more attributes in the qualifications of the job-seeker's profile; and the employers of the one or more job opening profiles may configure respectively, a third plurality of customized functional weights to two or more attributes in the corresponding qualifications of the one or more job opening profiles or the new job opening profile.

Likewise, the adjusting of the weighted fit score may be configured by one or a combination of the job-seeker and the employers. The job-seeker may configure a second plurality of customized functional weights to two or more attributes in the characteristics of the job-seeker's profile; and the employers of the one or more job opening profiles may configure respectively, a fourth plurality of customized functional weights to two or more attributes in the characteristics of the one or more job opening profiles or the new job opening profile.

As shown in FIG. 1C, the job matching algorithm 150 may be configured to automatically carry out weight adjustments 168a directly on the attributes of the qualifications (i.e., Match Score block 160) and weight adjustments 168d directly on the characteristics (Fit Score block 162) of the job-seeker profile and the job opening profile according to a specified range for the elastic analysis to search for a wider pool of talents or to search for a wider range of job openings.

The job matching algorithm 150 may include training an artificial intelligence (AI) system to perform the adjusting of the weighted match score and the adjusting of the weighted fit score for the re-matching to the one or more job opening profiles and the new matching to the new job opening profile as shown in FIGS. 1A to 1C. When the re-matching or the new matching is unsuccessful, the job matching algorithm 150 may invite the job-seeker to consider other jobs, and in some cases the job matching algorithm 150 may query to explore other career paths based on the elastic analysis in matching to more job openings from an employer database 124 under a curation criteria over a defined range of the adjusted weighted match score and over a defined range of the adjusted weighted fit score.

In practice, upon a successful matching or re-matching of a job opening profile, certain job-seeker's demographic information in the job-seeker profile that are subjected to protection from discrimination (e.g., race, age, gender, religion, physical disability) may be withheld from immediate release to the employer of the at least one job opening profile or to the employer of the new job opening until a favorable recruitment or hiring decision is made.

In addition, the job matching algorithm 150 may perform identity verifications and background checks on the job-seeker based on the job-seeker's profile, wherein the identity verifications and background checks may include checking from one or more of: a public database, the applicant database and one or more social websites. For example, the identity verifications and background checks may include checking one or a combination of: legal residency status, past criminal records or drug offenses, sex offenders registration, professional licenses or certification requirements, veteran status or military service, active or past membership with communist party, hateful organization affiliation, and terrorists watch list, to name a few examples.

In implementation, the job matching algorithm may charge employers in the employer database a defined percentage of an annual salary of a successful hiring of the job-seeker after a probation period. The employers in the employer database may pay an annual membership fee to post the one or more job opening profiles and pay a fee per successful match to the one or more job opening profiles. Alternately, the employers who post the one or more job openings in the employer database 124 may be charged a cost per click fee when the job opening website has been visited by the job-seeker after browsing longer than a defined duration.

The AI system 151 may connect the job-seeker to education/training (E/T) provider 126 web-links for further job education/training, which the E/T providers may be charged a cost per click advertising fee when the E/T website is visited by the job-seeker through weblink redirection and after browsing longer than a defined duration. In addition, the AI system 151 may harvest profile data from a professional social website to identify potential prospects for successful matching to the one or more job opening profiles, and may push invitations to the potential prospects to apply to the one or more job opening profiles.

Figure 2:
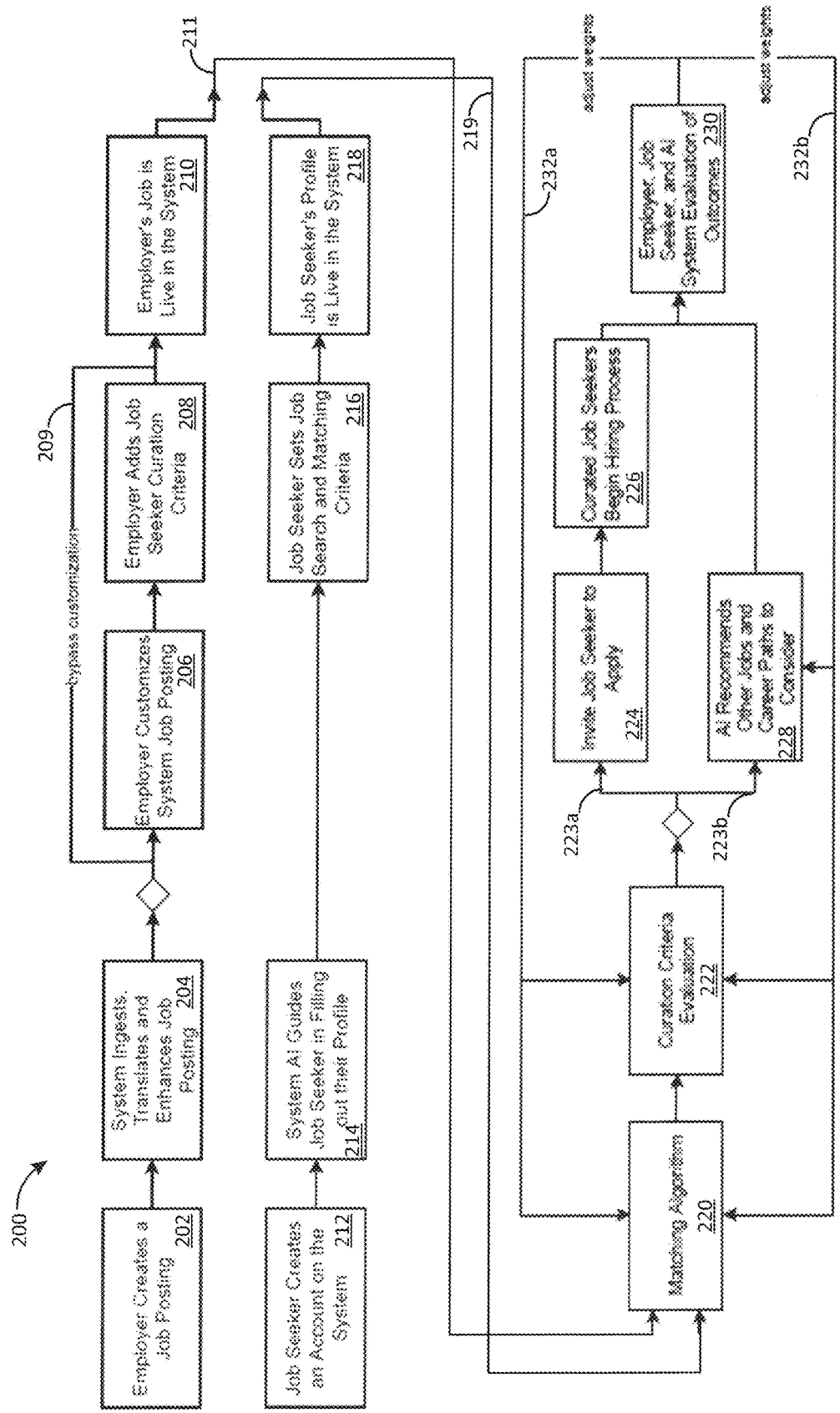
FIG. 2 illustrates an example of the various functional blocks to implement an artificial intelligence (AI) system in job matching and recruitment services.

FIG. 2 illustrates an example of the various functional blocks to implement an artificial intelligence (AI) system 200 in job matching and recruitment services. In an example, the AI system 200 may be a separate program working independently from the job matching algorithm 150. In another example, the AI system 200 may be an integral program working under the control of the job matching algorithm 150.

In block 202, the AI system 200 may retrieve a job posting profile from the employer database 124. In block 204, the AI system 200 may ingest, translates and enhances the job posting. For example, the system 200 may capture the employer's raw job posting, translate it into the system's jobs data model, and enhance the data content to improve customized match and fit scores for that job. The one or more job opening profiles or the new job opening profiles (i.e., raw job posting) may be translated into standard occupational data model using codes including one or a combination of: Occupational Information Network (O*NET) code, software product commodity code (UNSPSC), Standard occupational classification code, classification of instructional program code (BLS) and unique school ID (UNITID).

In block 206, the employer may customize the job opening profiles (system job posting), by specifying a listing of the qualification attributes and the characteristics attributes (with or without an associated weight) as job criteria to further improve their match and fit scores. In block 208, the employer may add job-seeker curation criteria. For example, the employers may have the option to set job criteria, to sort, aggregate, and clarify job seeker requirements based on match scores, fit scores, and other custom criteria defined by the employer.

Independently, in blocks 212-214, the AI system 200 may guide a job-seeker to create an account in filling out their profile to be stored in an applicant database 122. The AI system may assist the job-seeker in filling out their profile to maximize their match and fit scores for jobs, occupations, and career paths. The AI system 200 may dynamically present job seeker's elements of their profile, such as the qualifications attributes and characteristics attributes (with or without an associated weight) to complete answers to questions based on previously filled in information.

In block 216, the job-seeker may set his/her job search and matching criteria. For example, the job-seekers may have the option to set the criteria by which jobs and occupations are presented to them based on match scores, fit scores, geographic location, city radius or range of travel distance for job, full-time or part-time work, demographics, and other custom criteria defined by the job-seeker.

The AI system 200 may use the job matching algorithm in block 220 to perform live matching of the job-seeker profile from the applicant database 122, to the one or more job openings profile from the employer database 124 in blocks 210 and 218. The curation criteria evaluation in block 222 may evaluate the job opening profile and the job-seeker to determine a weighted match score, and a weighted fit score according to the job opening curation criteria to determine which events (i.e., which matched attributes) to trigger next in the recruiting and hiring process.

If a successful match is found, that is, the scores and curation criteria are met for both employer and job seeker, then blocks 224 and 226 in the system 200 may proceed to the next level decision to automatically invite the job seeker to apply to the job to begin the hiring process. Alternately, when no match is found, block 228 in the AI system may recommend other jobs and career paths for consideration. When the scores and curation criteria are not met for both employer and job seeker, the system's AI 200 may automatically recommend other jobs and career paths for the job seeker to consider based on their score and curation criteria.

In the Employer, Job Seeker, and System Evaluation of Outcomes block 230, the employer, job seeker, and AI system may each evaluate the appropriate state-based behavioral outcomes of the recruitment and hiring process, and adjust or recommend adjustment (see feedback paths 232a, 232b) of the functional weights of the "Matching Algorithm" in block 220, the "Curation Criteria Evaluation" block 222, and the "AI Recommends Other Jobs . . . " block 228. These adjustments or recommended adjustments may occur either via manual intervention from one or a combination of: the employer, the job-seeker or via the supervised AI learning feedback loops 232a, 232b.

Figure 3:
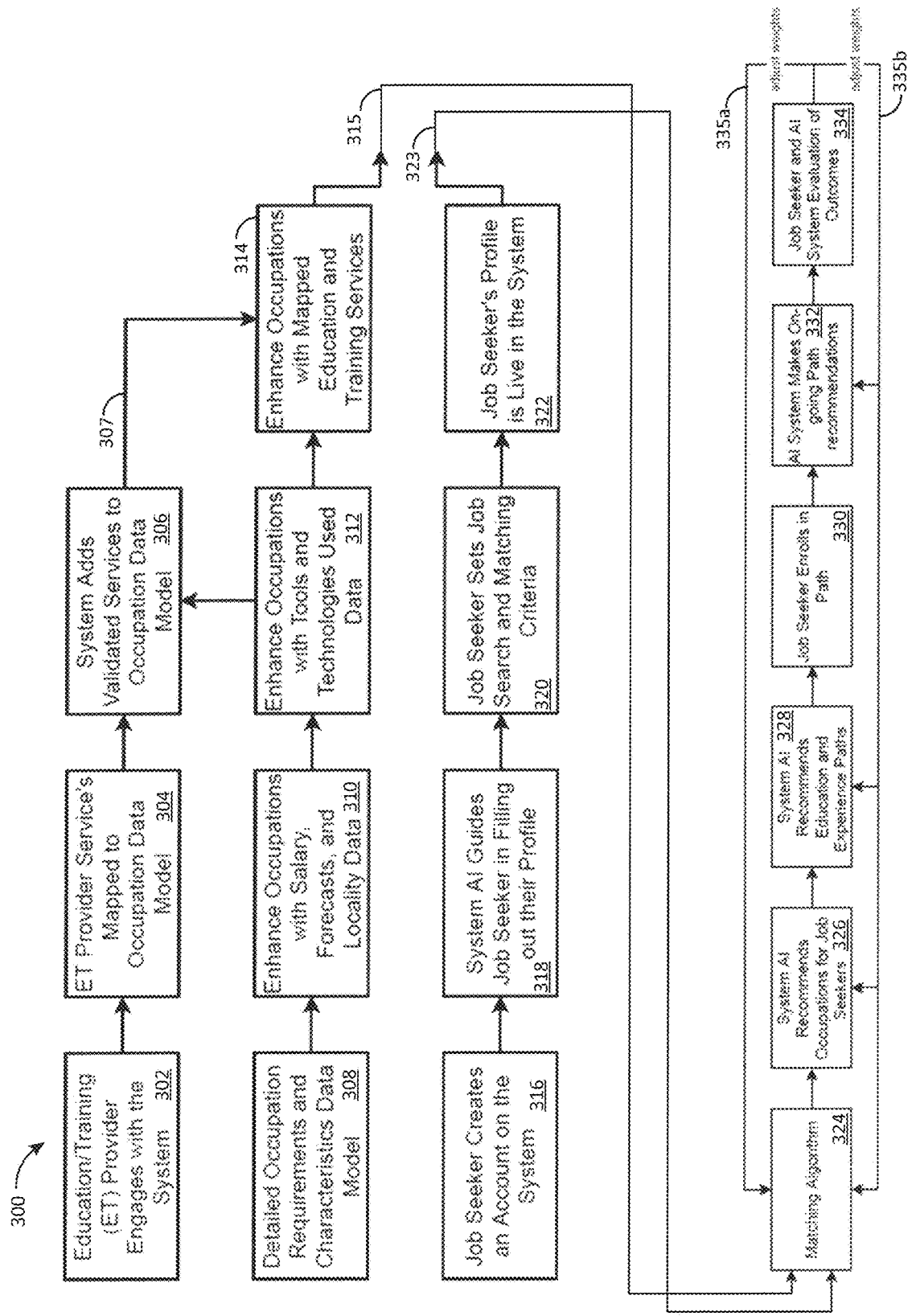
FIG. 3 illustrates an example of the various functional blocks to implement AI in job matching and job training services.

FIG. 3 illustrates an example of the various functional blocks to implement AI system 300 in job matching and job training services. AI system 300's block 302 (Education/Training (ET) Provider Engages with the) may communicate with providers of education, training, and certificate programs to engage directly or indirectly with the AI system 300 to recommend their education/training programs to the job-seeker and after the elastic analysis. In block 304, the ET provider services may be mapped to Occupation Data Model in the job opening profile. In block 306, the AI system 300 may add validated services to the occupational data. In blocks 308, detailed occupation requirements (qualifications) and characteristic data model from the job opening profile may be enhanced by blocks 310, 312 to include information such as salary, job forecast and locality data, tools and technology used data. Block 314 may enhance occupations with mapped education and training services.

Separately, in block 316, a job-seeker may create an account on the Applicant database 122. In block 318, the AI system 300 may recommend occupation for the job-seeker. In block 320, the job-seeker may set job search and matching criteria (see also block 216). In block 322, job-seeker's profile may retrieved by the AI system 300 to perform job matching by the job matching algorithm 150 in block 324. The job matching algorithm 150 may iteratively match the job seeker profile to one or more job opening profiles. In block 326, AI system 300 may recommend other job openings or occupations for the job-seekers. In block 326, the AI system 300 may review the results from the job matching algorithm 150 and evaluate what alternate occupations may be suitable for the job-seeker. In block 328, the AI system 300 may recommend Education and Experience Paths. For example, the AI system 300 may search for education providers to provide relevant training and certification programs to meet qualification attributes requirements for the more job openings.

The AI system 300 may also review job-seeker's education and experience opportunities for the candidate based on targeted occupations and then presents career paths and corresponding services to support the seeker when the job-seeker were to choose a given path.

In block 332, the AI system 300 may continue to make ongoing path recommendations. The AI system 300 may regularly review the seeker's progress, profile changes, new education and experience offerings, and macro-economic occupation changes to make smart recommendations for potential next steps. In block 334, the job seeker and the AI system 300 may evaluate the appropriate state-based behavioral outcomes of the job opening matching process and adjust or recommend adjustment of the functional weights of the "Matching Algorithm" and any "AI system Recommends . . . " blocks. These adjustments or recommended adjustments may occur either via manual intervention from the Job Seeker or via supervised AI learning feedback loops 335a, 335b.

Figure 4:
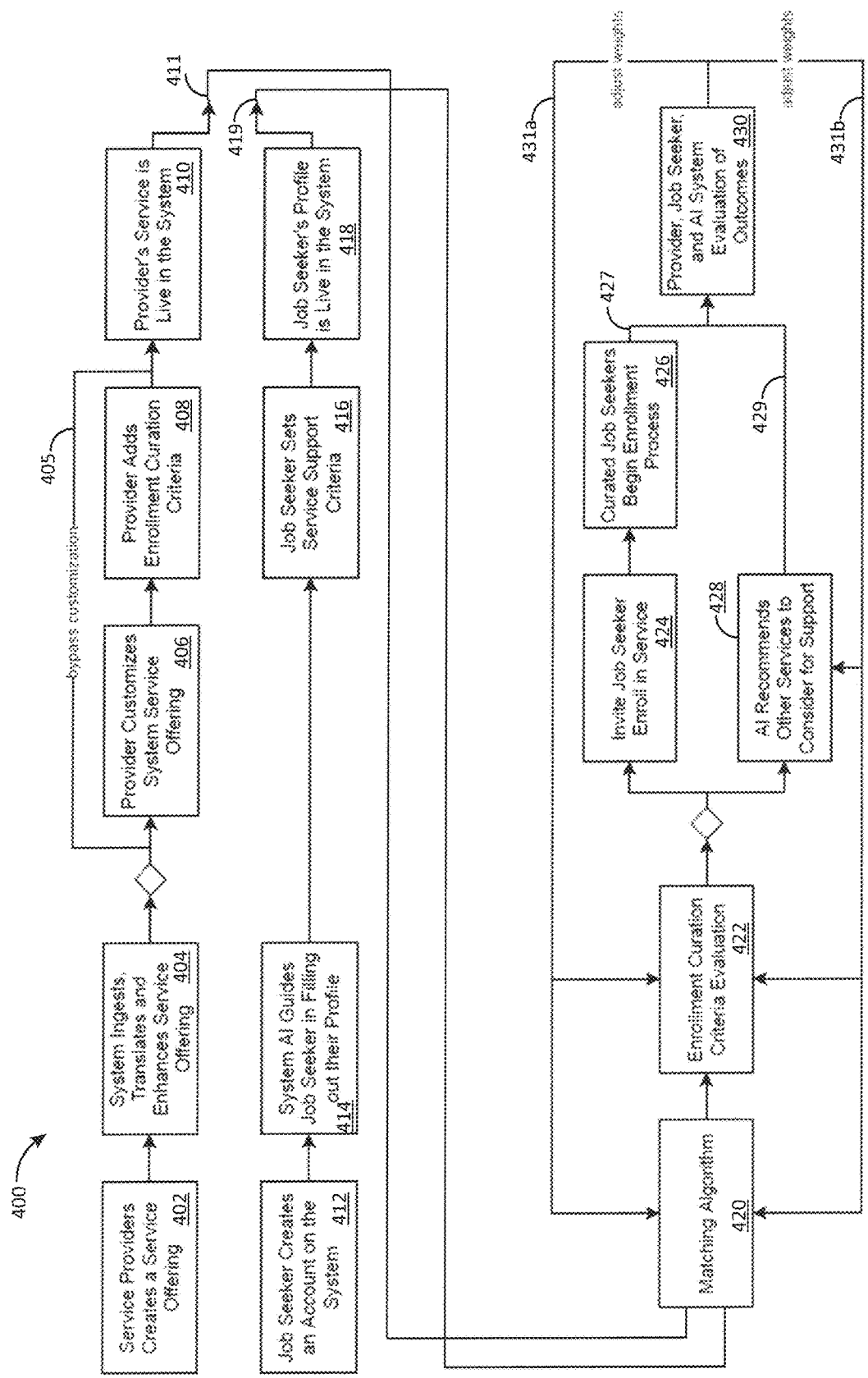
FIG. 4 illustrates an example of the various functional blocks to implement AI in job matching and well-being services.

FIG. 4 illustrates an example of the various functional blocks to implement AI in job matching and well-being services. FIG. 4 and FIG. 2's description may be similar in many ways, except the types of service offering. In block 402, a service provider 126 (see FIG. 1C) may create a service offering. For example, the service providers 126 may provide a tangible service to a job seeker 128 that may not be employment. This service may include but not limited to food, shelter, education, financial assistance, healthcare, legal assistance, and family care.

In block 404, the system may ingest, translate and enhance service offerings. The AI system 400 may capture the service provider's raw service offering, translates it into the system's services data model, and enhances the data content to improve customized match and fit scores for that service offering. In block 406, service provider 126 may customize system service offering to further improve their match and fit scores.

In step 408, service provider 126 may add job-seeker curation criteria. Service provider 126 may have the option to set criteria by which job-seeker to sort, aggregate, and clarify service offering enrollment requirements based on job seeker match scores, fit scores, demographics, and other custom criteria defined by the provider. In block 416, the job-seeker may set the service offering search and matching criteria. In block 416, the job-seeker may have the option to set the criteria by which service offerings are presented to them based on match scores, fit scores, geographic location, demographics, and other custom criteria defined by the job seeker (see also block 216). In block 420, the job matching algorithm may iteratively match the job-seeker to service offerings. In block 422, the enrollment curation criteria may evaluate the service offerings and job-seeker scores and curation criteria to determine which events to trigger next in the service offerings enrollment process.

In block 424, when the overall scores and curation criteria are met for both provider and job seeker, then the system will automatically invite the job seeker to enroll in the service offering. In block 428, when the overall scores and curation criteria are not met for both the provider and the job seeker, the system's AI will automatically recommend other services for the job seeker to consider based on their score and curation criteria. In block 430, the service provider 126, job seeker 123, and AI system 400 will evaluate the appropriate state-based behavioral outcomes of the servicing offering enrollment process and adjust or recommend adjustment of the functional weights of the "Matching Algorithm", "Enrollment Curation Criteria Evaluation", and "AI Recommends Other Services . . . " blocks. These adjustments or recommended adjustments may occur either via manual intervention from the Provider and Job Seeker or via supervised AI learning feedback loops 431a, 431b.

Figure 5A:
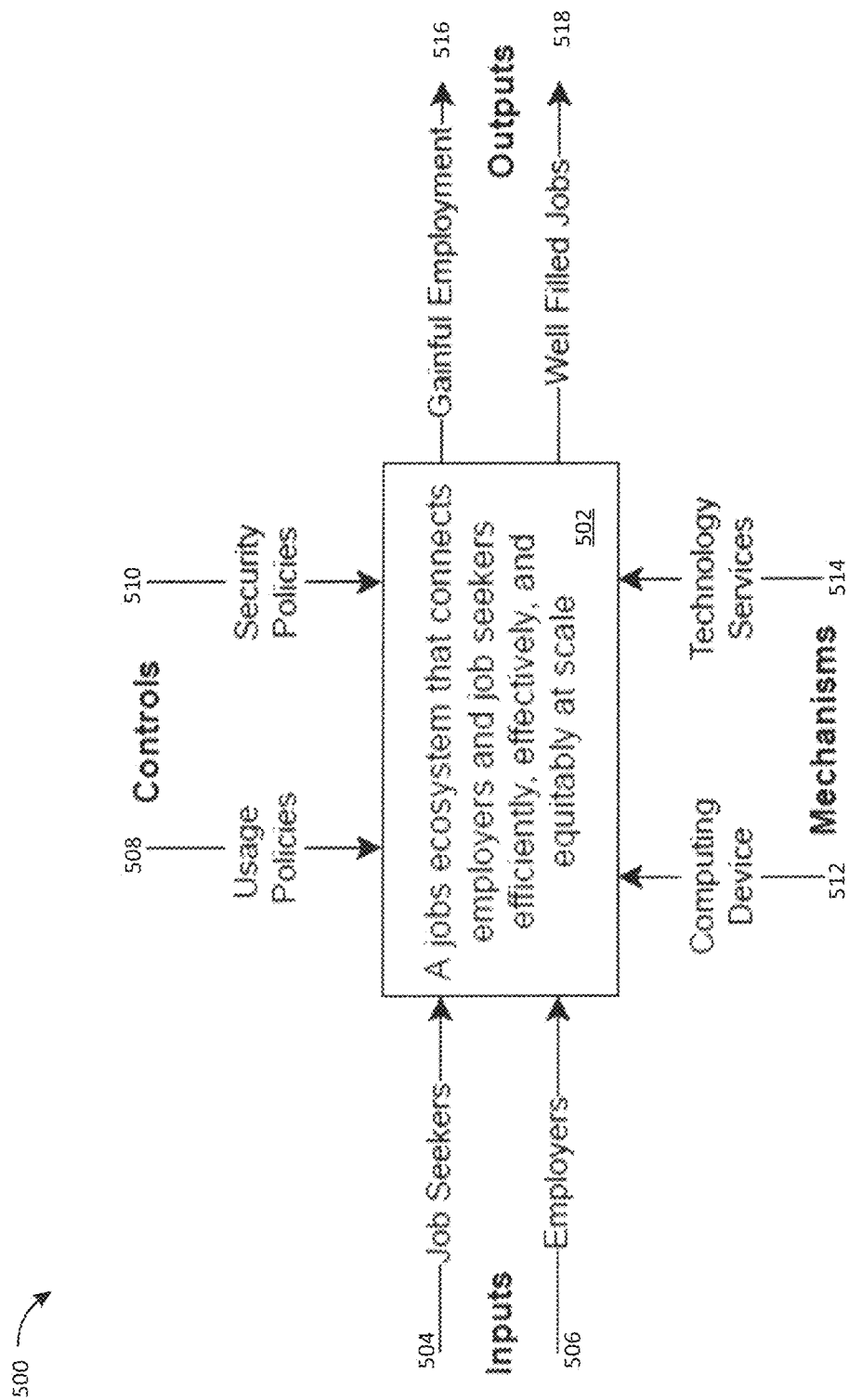
FIG. 5A-5B illustrate an example of the various functional blocks to implement AI in a job matching and hiring services.
Figure 5B:
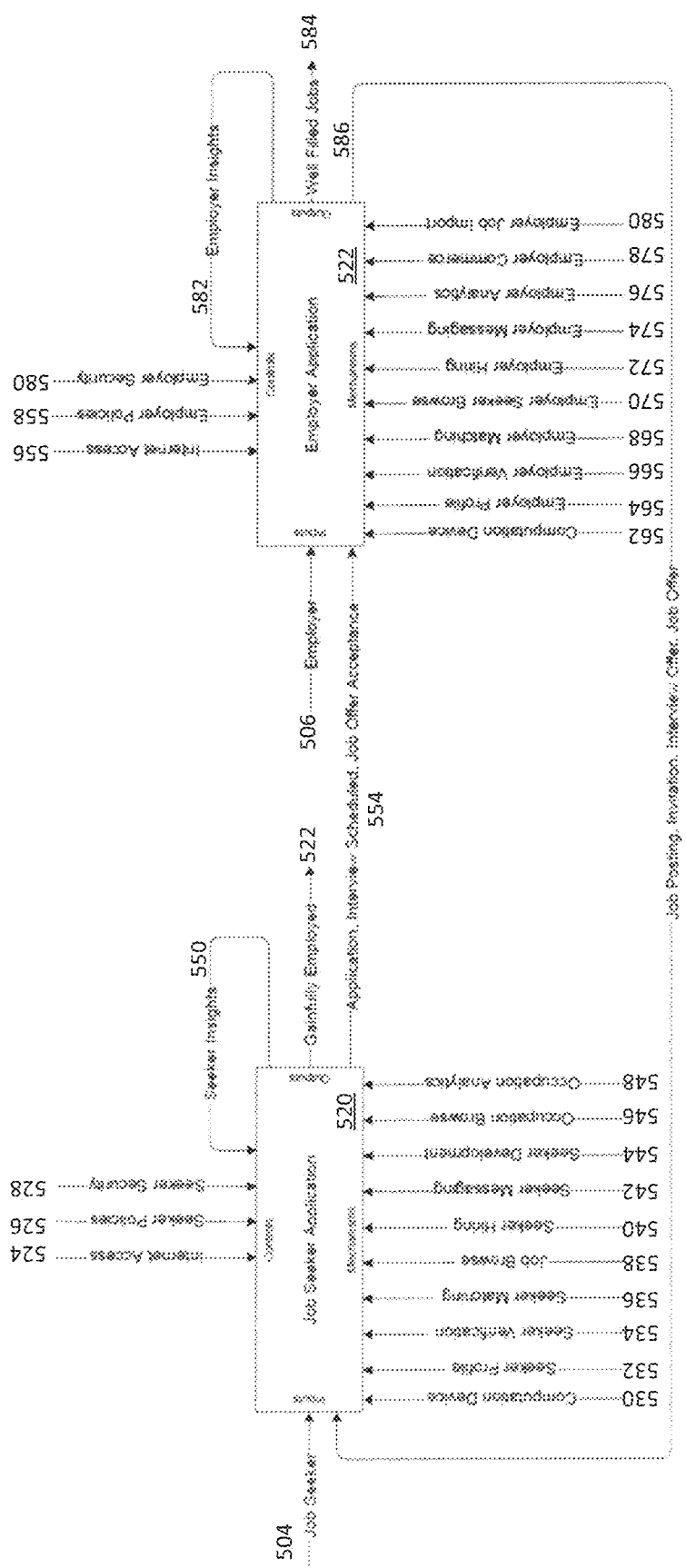

FIG. 5A-5B illustrate implementing artificial intelligence (AI) in a job matching and hiring services. FIG. 5A illustrate a job ecosystem 502 that connects employers 506 and job seekers 504 efficiently, effectively, and equitably at scale. The ecosystem 502 may be controlled by usage policies 508 and security policies 510, employing a computing device 512 (mobile phones, computers, servers) and technology services 514 such as Internet providers. The output goals include gainful employment 516 and well filled jobs 518.

FIG. 5B illustrates a job-seeker application 520 which may be run on the server 140 and logged by job-seeker's communication device 123. The job-seeker application 520 may match and connect the job-seeker to employment by providing customized match scores and facilitating the entire hiring, career development, and support services process. Various inputs 524-550 are provided to the job-seeker application 520 (within the job matching algorithm 150), including a feedback input 586 from the employer application 522.

In an example, the job-seeker profile 532 may represent the digital identity of the job-seeker that is used by the job-seeker application 520 and is fully owned by the job-seeker. The job-seeker verification block 534 programmatically certifies an identity of the individual (e.g., job-seeker) via background and related AI powered and manual identity verification services. The job browse block 538 may functionality enable the job-seeker to fully explore, select, and engage with jobs and careers in an intuitive and AI powered interface. The seeker hiring module 540 manages and tracks the end-to-end hiring processes needed to take a job-seeker from an exploration stage to an accepted offer and may include but is not limited to: applying, receiving invitations to apply, interviews, offer negotiation, and offer acceptance. Seeker messaging block 542 allows job-seekers to message employers and job-seekers directly within the solution portion of the job-matching algorithm, in order to gain employment, get career advice, negotiate offers, build a social network, find mentors, and related activities. The seeker development 544 module is the AI powered and self-directed system within the solution that enables job-seekers to learn about, select, and achieve career paths based on their personal goals, attributes, and abilities. Occupation browse block 546 functionality may enable the job-seeker to fully explore, select, and engage with occupations and careers in an intuitive and AI powered interface. The occupation analytics block 548 module may be a centralized and customized AI powered dashboard of information about occupation trends, needs, and forecasts to support the job-seeker in employment, development, and career exploration. Insights and data from job-seeker behavior and actions block 550 may be used by the job seeker application 520 as a feedback loop to incrementally and continuously improve itself via machine learning and AI algorithms. Once a job-seeker is hired 522, the system 500 verifies, validates, and monitors the hired status of the job-seeker with the employer and engages transactional fees per dynamic employer contractual agreements. Seeker policies block 526 may control the usage of the application by the job-seeker and establish the limits of the application to use job-seeker data. Seeker security 528 controls least privileged access and independently verifies the job-seeker's identity.

The employer application 522 (within the job matching algorithm 150) may be run on the server 140 and logged by employer's communication device 128. The employer application 520 matches and connects employers to job-seekers by providing customized match scores and facilitating the entire hiring, career development, and support services process. Various inputs 556-582 may be provided to the job-seeker application 520, including an input 554 from the job-seeker application 522.

The employer profile 564 may represent the digital identity, settings, and access controls of the employer that is used by the application and is fully owned by the employer. The employer verification block 566 may programmatically certify the identity of the employer via background and related AI powered and manual identity verification services. The employer seeker block 538 may functionality enable the employer to fully explore, select, invite, and engage with job-seekers in an intuitive and AI powered interface. The employer hiring module 574 may manage and track the end-to-end hiring processes needed to take a job-seeker from an exploration stage to an accepted offer that may include, but not limited to, applying, receiving invitations to apply, interviews, offer negotiation, and offer acceptance. The employer messaging block 574 may allow employers to message job-seekers directly within the solution in order to support hiring and career development related activities. The employer analytics 576 module may be a centralized, customized, and dynamic AI powered dashboard of information and advanced analytics simulation modeling about job, occupation, career, industry, and job-seeker trends, needs, and forecasts related but not limited to diversity, equity, inclusion, wages, skills, demographics, and community needs to support effective and efficient hiring, development, and systemic change. The employer commerce block 578 may be the solution's systematic verification and validation of hiring process activities and outcomes between the job-seeker application 520, the employer application 522, and the employer's hiring systems to engage in automatic invoicing and collection of payments with or without human intervention. The employer job import module 580 may be an AI powered ingestion, translation, and delivery of job postings into the system's standardized and dynamic job skills, abilities, and preference data model from any employer's existing job posting formats to be immediately used by the employer to automatically post that job or review and customize before posting. Furthermore, the employ job import module 580 normalizes and stores the original job description, the job characteristics and data into a centralized aggregated database that informs and powers the AI coaching and provides predictive and prescriptive insights in jobs, industries, occupations, and community outcomes and future needs (i.e., a "job crystal ball" or a "job Genie" analogy). Insights and data from the employer behavior and actions block 582 may be used by the employer application 520 as a feedback loop to incrementally and continuously improve itself via machine learning and AI algorithms. Once a job-seeker is hired, the system may send an output 584 to verify, validate, and monitor the hired status of the job-seeker with the employer and engages transactional fees per dynamic employer contractual agreements. The employer policies block 558 may control the employer's usage of the employer application 522 and may establish the limits of the employer application 522 to use employer data. The employer security block 580 may control least privileged access and independently verifies the employer's identity.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims. Steps mentioned in the disclosure may be carried out in any sequence or orders without limitation to achieve the intended objectives.

What is claimed is:

1. A computer implemented method of intelligent job matching, comprising:
    executing, by at least one processor on a computer, a job matching algorithm implemented by an artificial intelligence (AI) system, stored on a non-transitory computer-readable memory medium that performs online job opening matching between a job-seeker profile and one or more job opening profiles, comprising the job matching algorithm performing the steps of:
    retrieving from an applicant database, a first plurality of attributes in qualifications and a second plurality of attributes in characteristics of a job-seeker profile;
    determining a weighted match score, by matching the corresponding first plurality of attributes in the qualifications between the job-seeker profile and the one or more job opening profiles retrieved from an employer database;
    determining a weighted fit score, by matching the corresponding second plurality of attributes in the characteristics between the job-seeker profile and the one or more job opening profiles;
    combining the weighted match score and the weighted fit score to determine an overall score;
    training the AI system to continuously improve the job matching algorithm comprising a feedback loop implementing the following steps:
    evaluating the overall score by comparing the overall score to a first threshold score;
    when the evaluated overall score exceeds the first threshold score, establishing a successful match outcome for the one or more job opening profiles and when the overall threshold score is below the first threshold score, performing:
        (a) adjusting the weighted match score and the weighted fit score to redetermine an adjusted overall score; and
        (b) performing, according to the adjusted overall score, one or both of a re-matching to the one or more job opening profiles according to the first threshold score, and a new matching to a new job opening profile from the employer database, according to a second threshold score;
        (c) reiteratively training the artificial intelligence (AI) system to perform the adjusting of the weighted match score and the adjusting of the weighted fit score for the re-matching to the one or more job opening profiles and the new matching to the new job opening profile to incrementally and continuously improve the job matching algorithm based on data from job-seeker behavior and actions; and
    when a successful job opening re-matching or new job opening matching outcome is found by the trained AI system based on the adjusted overall score, advancing to the next recruitment or hiring decision, otherwise, continue to train the AI system by repeating the steps in (a) and (b) and (c) either until a successful job opening re-matching or new job opening matching or terminating after a defined number of repeated overall score adjusting, job opening re-matching or new job opening matching occurs; and
    evaluating the job opening matching outcome based on both the feedback loop and implementing:
    when the re-matching or the new matching is unsuccessful, inviting the job-seeker to consider other jobs and career paths based on matching to more job openings from the employer database under a curation criteria, over a defined range of the adjusted weighted match score and over a defined range of the adjusted weighted fit score.

2. The computer implemented method of intelligent job matching according to claim 1, wherein the feedback loop enables either the AI system or the job-seeker to elastically analyze, by adjusting or relaxing over a designated range of the assigned weight value from zero and upwards, over a selected portion of the attributes in both the qualifications and the characteristics in the job-seeker profile, to obtain the adjusted weighted match score and the weighted fit score with corresponding adjusted overall score that simulates risk assessment and adaptability to the rematched or new job opening.

3. The computer implemented method of intelligent job matching according to claim 1, wherein the feedback loop enables either the AI system or an employer to elastically analyze, by adjusting or relaxing over a designated range of the assigned weight value from zero and upwards, over a selected portion of the attributes in both the qualifications and the characteristics in the job opening profile in order to review a wider pool of talents, to obtain the adjusted weighted match score and the weighted fit score with corresponding adjusted overall score that simulates each individual job-seekers' strengths, weaknesses and adaptability to the rematched or new job opening.

4. The computer implemented method of intelligent job matching according to claim 1, comprising freezing over a defined minimum time period, further changes or updates triggered by the job-seeker, to the assigned weight value over a selected portion of the attributes in both the qualifications and the characteristics in the job-seeker profile, and unfreezing the job-seeker profile to allow changes or updates triggered by significant events which the job-seeker has attained or achieved in qualifications or credentials.

5. The computer implemented method of intelligent job matching according to claim 2, wherein the job-seeker benefits from the elastically analysis through receiving postings of jobs of current field or other field or career development guide information through education provider weblinks.

6. The computer implemented method of intelligent job matching according to claim 2, wherein the AI system is further configured to perform one or more of: adjusting or relaxing over a designated range of the assigned weight value of at least two attributes in each category of the qualifications and the characteristics in the job-seeker profile.

7. The computer implemented method of intelligent job matching according to claim 6, wherein a weight change in each attribute in the respective qualifications or the characteristics is balanced by adjusting an equal amount by one or more corresponding remaining attributes in the respective qualifications or the characteristics in the job-seeker profile.

8. The computer implemented method of intelligent job matching according to claim 6, wherein each attribute in the qualifications and the characteristics in the job-seeker profile has been initially assigned a default weight value.

9. The computer implemented method of intelligent job matching according to claim 1, wherein the AI system periodically searches for education providers and sends relevant training and certification programs to the job-seeker to help the job-seeker meet specific qualification attributes requirements for more job openings.

10. The computer implemented method of intelligent job matching according to claim 1, wherein the feedback loop of the AI learning system performs supervised learning by periodically reviewing job progress of the job-seeker and updating corresponding attributes of the qualifications and characteristics of the job-seeker profile in order to update potential job matching recommendations or education offerings.

11. The computer implemented method of intelligent job matching according to claim 1, wherein the AI system is further configured to perform one or more of: providing service recommendations in food, shelter, financial assistance, healthcare, legal assistance, transportation, and family care.

12. The computer implemented method of intelligent job matching according to claim 1, wherein the AI system is further configured to perform one or more of: an end-to-end job-seeker tracking process in different stages starting from job-seeking exploration stage to interview, offer negotiation or compensation analysis, offer acceptance, and career advancement stage.

13. The computer implemented method of intelligent job matching according to claim 2, wherein the AI system is further configured to perform one or both of: authenticating or verifying job-seeker's demographic information in the job-seeker's profile upon a favorable recruitment or hiring decision.

14. The computer implemented method of intelligent job matching according to claim 2, wherein the AI system is further configured to perform one or more of: analytic simulation and modeling of trends and growth in industry for jobs forecast, career development, wages, demographics statistics and feedback from job-seekers and employers.

15. The computer implemented method of intelligent job matching according to claim 12, wherein the AI system is further configured to perform one or more of: automatic invoicing or transactional fees collection per contractual agreement from one or both of job-seekers and employers, upon successful hiring through the new job opening matching or rematching.

16. The computer implemented method of intelligent job matching according to claim 1, wherein the AI system that implements the intelligent job matching is hosted in a Cloud infrastructure that is remotely accessible via a network through an interactive AI powered interface installed or accessed via browser by both the job-seeker and the employer.

17. The computer implemented method of intelligent job matching according to claim 2, wherein the AI system is configured to prompt the job-seeker to dynamically answer additional questions in order to perform anyone or more of:
 elastically analyzing job-seeker's suitability to the matched or re-matched job opening, and recommending relevant education training; and
 searching for education or training (E/T) providers to provide suitable certification programs to meet necessary license or certification requirements to qualify for the matched or re-matched job opening.

18. The computer implemented method of intelligent job matching according to claim 1, wherein the AI system is configured to forecast or negotiate on behalf of one or both of the job-seeker and the employer: a salary range, compensation and benefits, location for successful hiring or acceptance of the matched or re-matched job opening.

19. The computer implemented method of intelligent job matching according to claim 1, wherein the AI system is further configured as a "Genie" to provide predictive and prescriptive insights to forecast future trends in one or more areas of: jobs growth, industry or occupation, labor supply, education and technical degrees demands, and regional demographics or community shifts.

20. The computer implemented method of intelligent job matching according to claim 12, wherein the end-to-end job-seeker tracking process further comprising after the successful job opening matching or rematching in the recruitment and hiring process, providing feedback by evaluation or rating to one or more of:
 compensation and benefits;
 demographic diversity;
 cultural and social adaptiveness to an organization;
 career advancement opportunities; and
 recommended career choice or job satisfaction.

21. A non-transitory computer-readable medium which stores at least one code of a job matching algorithm, when executed by at least a processor in a computer, causes the computer to perform online intelligent job matching between a job-seeker profile and one or more job opening profiles, by performing the steps of:
 executing the job matching algorithm by an artificial intelligence (AI) system,
 retrieving from an applicant database, a first plurality of attributes in qualifications and a second plurality of attributes in characteristics of a job-seeker profile;
 determining a weighted match score, by matching the corresponding first plurality of attributes in the qualifications between the job-seeker profile and the one or more job opening profiles retrieved from an employer database;
 determining a weighted fit score, by matching the corresponding second plurality of attributes in the characteristics between the job-seeker profile and the one or more job opening profiles;
 combining the weighted match score and the weighted fit score to determine an overall score;
 training the AI system to continuously improve the job matching algorithm comprising a feedback loop implementing the following steps:
 evaluating the overall score by comparing the overall score to a first threshold score;
 when the evaluated overall score exceeds the first threshold score, establishing a successful match outcome for the one or more job opening profiles and when the overall threshold score is below the first threshold score, performing:
  (a) adjusting the weighted match score and the weighted fit score to redetermine an adjusted overall score; and
  (b) performing, according to the adjusted overall score, one or both of a re-matching to the one or more job opening profiles according to the first threshold score, and a new matching to a new job opening profile from the employer database, according to a second threshold score;

(c) reiteratively training the artificial intelligence (AI) system to perform the adjusting of the weighted match score and the adjusting of the weighted fit score for the re-matching to the one or more job opening profiles and the new matching to the new job opening profile to incrementally and continuously improve the job matching algorithm based on data from jobseeker behavior and actions; and when a successful job opening re-matching or new job opening matching outcome is found by the trained AI system based on the adjusted overall score, advancing to the next recruitment or hiring decision, otherwise, continue to train the AI system by repeating the steps in (a) and (b) and (c) either until a successful job opening re-matching or new job opening matching or terminating after a defined number of repeated overall score adjusting, job opening re-matching or new job opening matching occurs; and evaluating the job opening matching outcome based on both the feedback loop and implementing:

when the re-matching or the new matching is unsuccessful, inviting the job-seeker to consider other jobs and career paths based on matching to more job openings from the employer database under a curation criteria, over a defined range of the adjusted weighted match score and over a defined range of the adjusted weighted fit score.

* * * * *